United States Patent [19]

Park

[11] Patent Number: 4,701,370
[45] Date of Patent: Oct. 20, 1987

[54] FOAMED, OPAQUE, ORIENTED POLYMERIC FILM STRUCTURE AND PROCESS FOR ITS MANUFACTURE

[75] Inventor: Hee C. P. Park, Fairport, N.Y.

[73] Assignee: Mobil Oil Corporation, New York, N.Y.

[21] Appl. No.: 895,409

[22] Filed: Aug. 11, 1986

[51] Int. Cl.$^4$ .................... B32B 3/26; B32B 7/00
[52] U.S. Cl. .................... 428/314.4; 156/229; 264/210.7; 428/313.3; 428/315.5; 428/316.6; 428/317.9; 428/323; 428/910
[58] Field of Search ............. 428/313.3, 313.5, 313.9, 428/314.4, 314.8, 315.5, 315.7, 315.9, 316.6, 317.9, 323, 325, 327, 328, 910; 156/229; 264/210.7

[56] References Cited

U.S. PATENT DOCUMENTS

| | | | |
|---|---|---|---|
| 3,227,664 | 1/1966 | Blades et al. | 264/41 |
| 3,227,784 | 1/1966 | Blades et al. | 264/53 |
| 3,250,731 | 5/1966 | Buld et al. | 264/41 |
| 3,787,543 | 1/1974 | Parrish | 264/53 |
| 3,808,300 | 4/1974 | Miyamoto et al. | 264/53 |
| 3,839,240 | 10/1974 | Zimmerman | 264/41 |
| 3,871,897 | 3/1975 | Ealding | 117/15 |
| 4,048,272 | 9/1977 | Spicuzza, Jr. | 264/45.3 |
| 4,055,695 | 10/1977 | Last et al. | 428/195 |
| 4,360,556 | 11/1982 | Heider | 428/131 |
| 4,377,616 | 3/1983 | Ashcraft et al. | 428/213 |
| 4,438,175 | 3/1984 | Ashcraft et al. | 428/317.9 |
| 4,496,620 | 1/1985 | Park et al. | 428/323 |
| 4,560,614 | 12/1985 | Park | 428/317.9 |
| 4,578,297 | 3/1986 | Duncan | 428/317.9 |
| 4,582,736 | 4/1986 | Duncan | 428/317.9 |
| 4,582,752 | 4/1986 | Duncan | 428/317.9 |
| 4,582,753 | 4/1986 | Duncan | 428/313.3 |
| 4,626,460 | 12/1986 | Duncan | 428/317.9 |
| 4,632,869 | 12/1986 | Park et al. | 428/317.9 |

OTHER PUBLICATIONS

Eagle Mica M Series, product profile by Eagle Quality Products Co. (no date) 3 pages.

Primary Examiner—William J. Van Balen
Attorney, Agent, or Firm—Alexander J. McKillop; Michael G. Gilman; Charles J. Speciale

[57] ABSTRACT

There is disclosed a foamed, opaque, oriented polymeric film laminate which comprises:

(a) a thermoplastic polymer film containing a quantity of voids sufficient to render said film opaque, a substantial number of the voids containing at least one void-initiating particle which is phase distinct and incompatible with the polymer constituting the film, the void space occupied by the particle being substantially less than the volume of the void, with one generally cross-sectional dimension of the particle approximating a corresponding cross-sectional dimension of the void; and, (b) an optional void-free thermoplastic polymer skin layer adherently applied to at least one surface of polymer film (a), there being present in polymer film (a) and/or in optional skin layer (b) a quantity of vacant cells, the total volume of voids and cells being sufficient to substantially reduce the density of the entire polymeric film structure.

27 Claims, No Drawings

FOAMED, OPAQUE, ORIENTED POLYMERIC FILM STRUCTURE AND PROCESS FOR ITS MANUFACTURE

BACKGROUND OF THE INVENTION

This invention relates to oriented polymeric films of ultra-low density, e.g., from about 0.3 to about 0.5 gm/cm$^3$. More particularly, the invention relates to a biaxially oriented film which exhibits opacity and reduced density by the incorporation of particle-containing voids and vacant cells therein.

In the process for producing the ultramicrocellular filaments and sheets of U.S. Pat. Nos. 3,227,664 and 3,227,784, a confined mixture of a polymer plus at least one activating liquid is heated to a temperature and pressure at which a homogeneous solution is formed, and which temperature is greater than the normal boiling point of the liquid. This solution, either under autogenous pressure or higher pressure, is extruded abruptly to a region of substantially lower pressure and temperature under such conditions that a very large number of bubble nuclei exist at the extrusion orifice. The initial concentration is chosen such that vaporization of the activating liquid rapidly cools the solution to the temperature at which the polymer precipitates, and freezes in the polymer orientation produced in the rapid extrusion and expansion process. When super-autogenous pressure on the solution prior to extrusion is required to achieve adequate nucleation, the latter is obtained by dissolving a lower boiling additive in the solution which assist nucleation by increasing the internal pressure and lowering the surface tension of the solution. Although any soluble low boiling material is said to be suitable, the preferred materials are described as those which are super-critical at temperatures above the polymer melting point. Useful nucleation additives recited in these patents include $N_2$, $CO_2$, He, $H_2$, methane, ethane, propane, ethylene, propylene, certain fluorinated and/or chlorinated methanes and ethanes, and equivalents. Suitable activating liquids for use in the process of U.S. Pat. Nos. 3,227,664 and 3,227,784 should preferably have the following characteristics: (a) the liquid should have a boiling point at least 25° C., and preferably at least 60° C., below the melting point of the polymer used; (b) the liquid should be substantially unreactive with the polymer during mixing and extrusion; (c) the liquid should be a solvent for the polymer under the conditions of temperature, concentration and pressure employed; (d) the liquid should dissolve less than 1% of high polymeric material at or below its boiling point; and, (e) the liquid should form a solution which will undergo rapid vaporization upon extrusion, forming a non-gel polymer phase (i.e., a polymer phase containing insufficient residual liquid to plasticize the structure). Useful activating liquids are said to include methylene chloride, ethyl chloride, fluorotrichloromethane, pentane, butane, and ethanol. The polymers which are said to be suitable for use in the foregoing process are members of the class of film-forming, synthetic, crystallizable organic polymers which includes polyhydrocarbons such as linear polyethylene, stereoregular polypropylene or polystyrene; polyethers such as polyformaldehyde, vinyl polymers such as polyvinylidene fluoride; polyamides both aliphatic and aromatic, such as polyhexamethylene adipamide and polymetaphenylene isophthalamide; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate, and equivalents.

U.S. Pat. No. 3,250,731 describes a process for producing a low density stereoregular (i.e., isotactic) polypropylene foam sheet, tube, coating, etc., by blending the polypropylene with a blowing agent, e.g., a solvent blowing agent such as monochlorotrifluoromethane, monochlorodifluoromethane, dichlorotetrafluoroethylene, trichloroethylene, chloroform, carbon tetrachloride, and low boiling hydrocarbons such as butane, pentane, hexane, etc., in an extruder in which the temperature in the vicinity of the die face is at least as high as the softening temperature of the blend.

U.S. Pat. No. 3,787,543 describes a process for providing a foamed sheet of crystalline polymer, e.g., of linear polyethylene, isotactic polypropylene, and the like, which is similar to the process of U.S. Pat. Nos. 3,227,664 and 3,227,784, supra, but by careful control of the extrusion conditions, including omitting any deliberately added nucleating agents (e.g., finely divided pigments, delustering agents, occluded gases, etc.), regulating temperature and pressure conditions and the extrusion orifice, is able to provide a foamed product having relatively large cells.

In the process for preparing a closed-cellular foam product disclosed in U.S. Pat. No. 3,808,300, a crystalline, substantially linear polymer, e.g., polyethylene, polypropylene, and the like, is heated and melted in an extruder supplied with a pressurized foaming agent selected from the group consisting of hydrocarbons, ethers, ketones, esters and chlorinated hydrocarbons which are normally gaseous or liquid and boiling at temperatures ranging from 45° C. to 70° C., and a nucleating agent selected from the group consisting of (a) a mixture of (i) an acidic alkali metal salt of citric acid and (ii) a carbonate or bicarbonate which is capable of reacting with said acidic alkali metal salt at the temperature of the polymer in the extruder; and (b) a mixture of (a) and (iii) a monoglyceride of an aliphatic monocarboxylic acid of 8–20 carbon atoms; the blend of polymer, foaming agent and nucleating agent is cooled to a temperature which is lower than the melting point of the polymer by at least 2° C. but not lower than the temperature at which $-dP/dT$ becomes 20 (kg/cm$^2$° C), in $-dP/dT$, T being the temperature (°C.) of the blend at the extruding die of the extruder, and P being the extruding pressure (kg/cm$^2$) of the blend at the said die, and thereafter the blend is extruded from the extruder into a low pressure zone.

The polyolefin blend film-foaming process described in U.S. Pat. No. 4,055,695 employs a first blowing agent which is completely miscible with the molten blend and a second blowing agent which has a solubility of at least 0.01% by weight in the blend and has a critical temperature below the temperature of the homogeneous mixture of the molten blend and the blowing agent system at the point when the pressure on the mixture is released during extrusion. Examples of liquids which may be used as the first blowing agent include saturated hydrocarbons such as pentane, hexane, heptane, octane, methyl pentane and dimethyl pentane, unsaturated hydrocarbons such as pentene, 4-methylpentene, hexene, petroleum ether fractions, and halogenated hydrocarbons such as carbon tetrachloride, chloroform, ethylene dichloride, methylene chloride, or 1,1,3-trichloro-1,2,2- trifluoroethane. Useful second blowing agents include carbon dioxide, nitrogen, air, methane, ethane, propane, ethylene, propylene, hydrogen, helium, argon and halogenated derivatives of methane and ethane, e.g., tetrafluorochloroethane.

U.S. Pat. No. 4,377,616 describes an opaque biaxially oriented polymer film structure comprising a thermoplastic polymer core layer possessing numerous voids, a substantial number of which contain at least one spherical void-initiating particle, and transparent thermoplastic skin layers adhering to the surfaces of the core layer. The unique structure of the core layer imparts a much higher degree of opaqueness, possibly due to the effects of light scattering, than that possible by the use of opaquing pigment alone.

None of the foregoing prior U.S. patents disclose or suggest a foamed, opaque, oriented polymeric film featuring a combination of particle-containing voids as in U.S. Pat. No. 4,377,616 and vacant cells resulting from the use of a foaming agent.

SUMMARY OF THE INVENTION

It is an object of the present invention to provide an opaque, oriented polymeric film structure made up of one or more layers, the film exhibiting unusually low density by the incorporation therein of a combination of particle-containing voids whose major contribution is to impart opaqueness to the film and cells whose major contribution is to reduce the density of the film beyond that which can be achieved through the presence of voids alone.

It is a further object of the invention to provide a foamed, opaque, oriented polymeric film structure of enhanced stiffness.

It is a particular object of the invention to introduce density-reducing cells into the film structure of U.S. Pat. No. 4,377,616 while substantially retaining the opaque, lustrous appearance of the film and other of its desirable physical properties.

In accordance with the foregoing objects, there is provided a foamed, opaque, oriented polymeric film structure which comprises:

(a) a thermoplastic polymer film containing a quantity of voids sufficient to render said film opaque, a substantial number of the voids containing at least one void-initiating particle which is phase distinct and incompatible with the polymer constituting the film, the void space occupied by the particle being substantially less than the volume of the void, with one generally cross-sectional dimension of the particle approximating a corresponding cross-sectional dimension of the void; and, (b) an optional void-free thermoplastic polymer skin layer adherently applied to at least one surface of polymer film (a), there being present in polymer film (a) and/or in optional skin layer (b) a quantity of vacant cells, the total volume of voids and cells being sufficient to substantially reduce the density of the entire polymeric film structure.

The foregoing film structure is produced in accordance with a modification of the process described in U.S. Pat. No. 4,377,616 and comprises:

(a) providing a mixture of (i) thermoplastic polymer, (ii) a void-forming material which is phase distinct from the polymer and is incompatible therewith and, optionally, (iii) a foaming agent, it being further provided that when foaming agent is present, the mixture be maintained under elevated pressure to prevent premature expansion of the foaming agent;

(b) heating the mixture to a temperature at least above the melting point of the thermoplastic polymer (i);

(c) dispersing the void-forming material substantially uniformly throughout the molten polymer in the form of microspheres;

(d) extruding the microsphere-containing polymer mixture into a film, it being further provided that where foaming agent is present therein, the mixture be extruded into a zone of reduced pressure whereby the resulting expansion of foaming agent results in the formation of density-reducing cells in the film;

(e) providing an optional molten thermoplastic polymer optionally containing a foaming agent, it being further provided that when foaming agent is present, the optional molten thermoplastic polymer be maintained under elevated pressure to prevent premature expansion of the foaming agent;

(f) extruding the optional molten thermoplastic polymer into a film, it being further provided that where foaming agent is present therein, the mixture be extruded into a zone of reduced pressure whereby the resulting expansion of foaming agent results in the formation of density-reducing cells in the film;

(g) adherently applying the optional film resulting from step (f) either before or after expansion of optional foaming agent therein to a surface of the microsphere-containing film resulting from step (d) either before or after expansion of optional foaming agent therein to provide a laminate film structure; and, (h) orienting the film of step (f) or, where present, the laminate film structure of step (g), at a temperature and to an extent to form opaquing particle-containing voids in the microsphere-containing film, it being required that when the optional film of step (f) is not present, foaming agent must be present in the mixture of (a).

While a polymer film of very low density can be achieved solely by incorporating density-reducing cells therein, a variety of physical properties of the film will be adversely affected. Thus, barrier properties, tensile strength and stiffness will each suffer some loss. The unusual geometry of the voids present in the film structure of U.S. Pat. No. 4,377,616 also provides some reduction in the density of the film but without seriously degrading the aforesaid physical properties due, it would seem, to the tendency of the voids to make the film behave as though it were a multilayered or stratified structure rather than a foamed one. However, there is a maximum level of density reduction which can be obtained by the void-forming technique of U.S. Pat. No. 4,377,616, the resulting film structure exhibiting densities seldom below about 0.4–0.5 gm/cm$^3$. To successfully compete with known and conventional cellulose-based papers, a polymer film should possess a density within the range of from about 0.3 to 0.5 gm/cm$^3$ and preferably within the range of about 0.35 to about 0.45 gm/cm$^3$ and preferably within the range of about 0.35 to about 0.45 gm/cm$^3$ while still preserving good physical properties which enable it to function much in the same way as such papers. The polymeric film and film-forming procedure of this invention make it possible to realize these goals of ultra-low density and good physical properties through a combination of particle-containing voids and vacant cells in an oriented film structure.

The term "vacant" as applied to cells herein means the absence of solid material and is intended to distinguish the cells from the particle-containing voids. Both cells and voids can, and ordinarily will, contain gaseous material.

DESCRIPTION OF THE PREFERRED EMBODIMENTS

Although the film of the present invention can constitute a single void and cell-containing layer, it will be more particularly described hereinafter in connection with a preferred embodiment, i.e., one in which the void-containing film constitutes a core layer (a) and the optional film superimposed thereon to form a laminate structure constitutes one or more void-free skin layers (b). In this preferred embodiment, core layer (a) will, in addition to its particle-containing voids, contain all of the cell structure of the laminate, the void-free skin layer (b) being devoid of cells and serving to conceal irregularities in the underlying surface(s) of core layer (a).

In order to achieve the opaque lustrous appearance of the foamed film structure of the present invention, it is important that a particular thickness relationship exist between the thickness of core layer (a) and the thickness of optional skin layer(s) (b) which can be transparent or pigmented for even further opaqueness. It is preferred that the core thickness be from about 30 to about 85% of the overall structure. This, in combination with the population and configuration of the voids in a structure of at least about 0.5 mils thick, will materially contribute to the overall degree of opacity of the structure. The population and configuration of the voids and the core thickness will be such as to cause a significant degree of opacity, for example, less than about 70% light transmission. Similarly, by maintaining the skin thickness within a particular range in relation to the thickness of the core layer, the overall combination results in an opaque lustrous appearance. It is preferred that the average diameter of the void-initiating particles be from about 0.1 to about 10 microns. These particles should be spherical in shape so as to initiate a void of fairly regular geometry and orientation in a stratified relationship throughout the thermoplastic polymer material of core layer (a) after biaxial orientation of the film. The voids need not be uniform in size. Generally speaking, each void tends to be of like shape even though it may vary in dimensions from those of other voids because all of the voids are initiated by a spherical particle. Ideally, the voids assume a shape defined by two opposed and edge-contacting concave disks.

Optimum characteristics of opacity and lustrous appearance are obtained when the two average major void dimensions are greater than about 30 microns.

The void-initiating particle material, as indicated above, should be incompatible with the polymer constituting core material, at least at the temperature of biaxial orientation.

Core layer (a) has been described above as being a thermoplastic polymer material within which is located a strata of voids and cells. The term "strata" is intended to convey the understanding that the voids are so oriented that their major axes are aligned in correspondence with the direction of orientation of the polymeric film structure. After each void has been formed, the void-initiating particles occluded therein may contribute little else to the film laminate. For example, this may be the case where the refractive index of the void-initiating particles is close enough to that of the polymer constituting the core layer that it makes no apparent contribution to opacity. When this is the case, opacity is thought to be principally a function of the light scattering affect which occurs due to the presence of the voids in the core layer. The opacity of the film can be enhanced by the inclusion of opaquing pigment dispersed throughout the core. A particularly preferred proportion of pigment in the core layer can be from about 1 to about 3% by weight thereof. The pigment material will be of such a size and shape that it will not significantly contribute to void initiation. The optional presence of opaquing pigment contributes perhaps 3 to 8% of the total opaqueness of the film.

A typical void may be described as having major dimensions X and Y and minor dimension Z where dimension X is aligned with machine direction orientation, dimension Y is aligned with transverse direction orientation and dimension Z approximately corresponds to the cross-sectional dimension of the spherical particle which initiates the void. It is necessary that orientation conditions be such that the X and Y dimensions of the voids of the core be major dimensions in comparison to the Z dimension. Thus, while the Z dimension generally approximates the cross-sectional dimension of the spherical particle initiating the void, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction orienting or stretching, the temperature conditions must be such as to permit these major dimensions to form without any destruction of the voids in any of its dimensions. The voids are particularly vulnerable to destruction during sequential orientation if the stretching forces tend to cause internal shredding and void splitting. This leads to a complete loss of control over the integrity of the individual closed voids and the consequent integrity of the core polymer. Thus, one skilled in the art following the present general guidelines can orient at a temperature and to a degree which will yield X and Y dimensions approaching a maximum without causing any significant amount of splitting, shredding or overall lack of void and core integrity.

By way of illustration, room temperature biaxial orientation of polypropylene film (a) containing polybutylene terephthalate spheres of the size and amount contemplated herein will not produce the claimed structure. Either void splitting will occur or voids of insignificant size will result. Polypropylene must be oriented at a temperature which is significantly higher than its glass transition temperature. The temperature conditions must permit X and Y to be at least several multiples of the Z dimension without incurring any significant incidence of void splitting. If this is accomplished, optimum physical characteristics including low water vapor transmission rates and a high degree of light scattering will be obtained with little, if any, void splitting or film fibrillating.

As indicated above, the polymer constituting core layer (a) and the void-initiating particle must be incompatible in the sense that the materials form two distinct phases. The spherical void-initiating particles constitute a dispersed phase throughout the lower melting core polymer which polymer will, upon orientation, become a void-filled matrix with the spherical particles contained somewhere within the voids.

As a result of the biaxial orientation of the film laminate described herein, in addition to rendering its core layer opaque, the orientation improves other physical properties of the laminate such as flex-cracking resistance, Elmendorff tear strength, elongation, tensile strength, impact strength and cold strength properties. In addition to this, an unusual and highly attractive lustrous appearance is imparted to the film. This appearance is generally not seen in the absence of the skin layer(s) or if thickness of the skin layer(s) is not enough to conceal surface imperfections of the core layer. The resulting film can also possess low water vapor transmission rate and low oxygen transmission rate characteristics. This makes the film ideally suited for packaging food products, including liquids. The film also has attractive utility as a decorative wrap material.

Generally, by far the greater number of voids will be closed as a result of which there is essentially no opportunity for liquid and/or gas to penetrate the core layer.

The void-initiating particles can be organic or inorganic provided and preferably are approximately spherical in shape and within a particle size range capable of forming voids which, in most cases, will take on a lenslike shape, i.e., a lens of biconvex shape. When a polymeric material is employed as the void-initiating particle, it can be a polymer which is comelted with the polymer of the core layer. In such case, it is necessary for the void-initiating polymer to have a sufficiently higher melting point than the core polymer to be incompatible therewith and to be capable of assuming a dispersed phase in the form of small spherical particles as the temperature of the co-melted mix is reduced. It is also contemplated that the void-initiating particles can be preformed and then uniformly dispersed into a melt of core polymer, e.g., one of polypropylene. This has the advantage of avoiding subjecting the core polymer to the temperature of a much higher melting polymer thereby minimizing the risk of thermal degradation of the core polymer.

It is believed that because of the number, shape and orientation strata-wise of the voids in core layer (a), a significantly enhanced light scattering effect is obtained. This effect is further increased by the presence of at least one transparent or pigmented skin layer coextensively applied to the core layer.

When pre-formed void-initiating particles are employed, it is the shape and size of the particles that is important rather than their chemical nature. Thus, solid or hollow organic or inorganic particles of any type can be employed. Interesting effects can be achieved by the use of spheres of different colors. Since statistically each void has approximately one particle somewhere within the void, interesting and aesthetically pleasing color and/or reflectance effects can be imparted to the overall layer structure by use of particles of different color absorption or reflectance. The light scattered in a particular void is additionally either absorbed or reflected by the void initiating particle and a separate color contribution is made to the light scattering in each void.

The void-initiating particles can be based on any of a variety of thermoplastic resins such as polybutylene terephthalate, polyethylene terephthalate acetals, polyamides, acrylic resins, etc., provided they remain phase distinct and incompatible with the resin constituting the remainder of core layer (a). Polybutylene terephthalate (PBT), also known as polytetramethylene terephthalate (PTMT), is an especially preferred void-initiating material for use herein. This material is a highly crystalline polymer obtained from the polycondensation of dimethyl terephthalate with 1,4-butanediol. PBT possesses good mechanical, chemical and electrical properties. It has good flowability and a rapid crystallization rate. It has a melting point of 440° F. and a glass transition temperature of approximately 104° F. It has good thermostability and relatively high UL temperature indices. This material has good tensile strength, toughness and dimensional stability, low water absorption, and low static and dynamic coefficients of friction. Typical processing conditions for PBT involve melts at 450°–500° F. Melt temperatures in excess of 520° F. should be avoided.

Inorganic materials which are useful as void-initiating particles include solid or hollow preformed glass spheres, metal beads or spheres, ceramic spheres, etc. In fact, any material which can be formed into a sphere without causing thermal degradation to the core polymer is entirely suitable herein.

The incorporation of voids in the core layer of the present films permits a reduction in light transmission therethrough to as low as about 16% and even lower. This would be the case with a film having an overall thickness of at least 1.5 mils where the core portion is at least 60% and the thickness of the skin layer(s) makes up the remaining 40% thickness.

While the preferred particle size of the void-initiating particles is generally on the order of from a about 0.1 to about 10 microns, it is particularly preferred that the particle size range from about 0.75 to about 2 microns. The void-initiating particles can be present in up to about 20% by weight of core layer (a) prior to orientation, a preferred range being from 2 to about 7 percent by weight.

For convenience and more precise control of the formulation and character of the core layer, a master batch technique can be employed either in the case of forming the spherical particles in situ or in adding preformed spheres to the molten core polymer. After the formation of a batch, appropriate dilution of this system can be made by adding additional thermoplastic core polymer until the desired proportions are obtained.

Any of the foaming agents and foaming procedures heretofore employed in the manufacture of cellular polymers can be suitably employed herein including those described in aforementioned U.S. Pat. Nos. 3,227,664; 3,227,784; 3,250,731; 3,787,543; 3,808,300; and, 4,055,695, the contents of which are incorporated by reference herein. The expression "foaming agent" is to be understood in its broadest sense as applying to any of the individual foaming agents, foaming systems and foaming agents, as well as mixtures thereof, known to be useful in the foaming of cellular polymers (other than polyurethane foams which are formed by as entirely different mechanism).

Foaming agents of both the solvent and the chemical type can be used. When using a solvent-type foaming agent, it may be selected with the same criteria disclosed in U.S. Pat. Nos. 3,227,664 and 3,227,784 and set forth above. In general, any organic material which is a solvent for the polymer constituting core layer (a) and which is gaseous or liquid and boils at temperatures of from about −45° C. to about +70° C. is suitable.

Examples of solvent-type foaming agents which are advantageously used herein include the low boiling hydrocarbons such as the butanes (n-butane and isobutane), pentane (n-pentane and isopentane), n-hexane, etc., and halogenated hydrocarbons such as monochlorotrifluoromethane, monochlorodifluoromethane, dichlorodifluoromethane, dichlorotetrafluoroethylene, trichloroethylene, chloroform, carbon tetrachloride, etc. If desired, the solvent-type foaming agent can be used in combination with a nucleating agent to control foaming as is known. Preferred nucleating agents include a combination of citric acid and sodium bicarbonate which react at room temperature, and even more preferred, a mixture of an acidic alkali metal salt of citric acid and a carbonate or bicarbonate which is capable of reacting with the acidic alkali metal salt, e.g., a mixture of monosodium citrate and sodium bicarbonate as these will only react at the higher temperatures of the extruder.

Chemical foaming agents which can be used herein include, for example, azo bis(formamide), diazoaminobenzene, N,N'-dinitrosopentamethylene tetramine, N,N'-dimethyl-N,N'-dinitrosoterephthalamide, p,p'-oxy-bis(benzene sulfonyl semicarbazide), azo bis(isobutyronitrile), p,p',oxy-bis(benzene sulfonyl hydrazide), p,p'-diphenyl-bis(sulfonyl hydrazide), benzenesulfonyl hydrazide, m-benzene-bis(sulfonyl hydrazide), etc. Poly(azidoformate) is a known chemical foaming agent which can be used herein with generally good results.

Regardless of whether a solvent-type or a chemical-type foaming agent is used, the temperature in the vicinity of the die of the extruder must be at least as high as the softening temperature of the mixture. The softening temperature of this mixture, or blend, will depend upon whether the foaming agent is a solvent-type or a chemical-type. Thus, with a solvent-type foaming agent, the core polymer will at least partially dissolve so that the softening temperature of the blend will be well below the melting point of the polymer. On the other hand, with a chemical foaming agent, the softening temperature of the blend will be the melting point of the polymer. Accordingly, the temperature within the extruder must be at least as high as the softening temperature of the mixture passing through the extruder. The exact temperature to be used for the total operation will depend upon the foaming agent used, the residence time in the extruder, etc. As the core layer emerges from the extruder into a zone of reduced pressure (typically atmospheric pressure although, of course, a subatmospheric zone can be provided) and temperature, the sudden release of pressure causes the foaming agent to volatilize thereby forming cells (which may be closed or open) within the structure of this layer. For a film laminate in which core layer (a) and skin layer(s) (b) are both formed from an isotactic polypropylene, it is desirable to carry out the foaming operation under conditions intended to provide an overall product density of from about 0.3 to about 0.5 gm/cm$^3$ and preferably from about 0.35 to about 0.45 gm/cm$^3$ or less at ambient temperature.

Since the density of the foamed core layer is related to the total volume of the cells therein (the average size or total number of cells being of relatively minor significance) and since the total volume of the cells is related to the type and quantity of foaming agent employed and to some extent, conditions of extrusion as well, the overall density of the film laminate desired and the composition of the core layer will be principal considerations in the selection of foaming agent, the amount used, the extrusion conditions and the geometry of the die face. For a film laminate of given composition, construction and density, this selection can be readily determined for an optimized process employing simple and routine testing.

Additives, such as fillers, antioxidants, pigments, antistatic agents, slip agents, antitack agents, and the like, can be incorporated in the usual amounts in one or more of the layers constituting the laminate film.

It has been discovered that the addition of a relatively minor amount of particles (platelets) of titanium dioxide-coated mica, e.g., the Eagle Mica M series of Eagle Quality Products Co., Uwckland, Pa., to the polymer constituting the skin layer(s), e.g., from about 0.1 to about 10 weight percent thereof, provides a marked increase in the stiffness of the resulting film laminate, such addition accordingly being a preferred embodiment of the present invention.

It is preferred to coextrude the core layer and the skin layer(s) in producing the film laminate of this invention. Thereafter, the laminate (whether prepared by coextrusion or some other technique) is subjected to biaxial stretching, or orientation, to an extent and at a temperature calculated to provide the maximum degree of opacity without any significant impairment in the physical characteristics, including appearance, of the film. Obviously, as the materials employed in the construction of the film differ, the conditions of biaxial orientation will be modified to reflect the difference(s). By way of exemplification, when employing a stereoregular polypropylene as the core polymer and when employing PBT as the void-initiating material, a machine direction orientation of from about 4 to 8 times and a transverse direction orientation of from about 4 to 8 times, at a drawing temperature of from 100° C. to 160° C. can be used to provide a foamed, opaque, biaxially oriented film of from 0.7 to 5 mils overall thickness.

If desired, the exposed surface of one of the skin layers can be treated in a known and conventional manner, e.g., by corona discharge, to improve its receptivity to inks.

The following examples are illustrative of a laminate film structure in accordance with this invention and the process by which the laminate can be obtained.

EXAMPLE 1

A confined mixture of isotactic polypropylene (93 weight parts, MP 160° C., melt index 4.5), and PBT (6 weight parts, MP 227° C.) containing titanium dioxide particles (1 weight part) is melted in an extruder provided with a screw of L/D ratio of 20/1 in the presence of 0.3–0.4 weight percent poly(azidoformate) chemical foaming agent which undergoes decomposition under extrusion conditions. A second extruder in association with this first mentioned extruder is supplied with the same isotactic polypropylene as the first extruder. A melt coextrusion is carried out while maintaining the cylinder of the core polymer material at a temperature sufficient to melt the polymer/foaming agent mixture, i.e., from about 135° C. to 190° or even higher. The polypropylene to be extruded as the skin layers ($b_1$) and ($b_2$) is maintained at about the same temperature as the core polymer. A film laminate is coextruded with a core thickness 40% of the total extruded thickness with the skin thicknesses representing the balance. Virtually immediately upon release to atmospheric pressure and at ambient temperature, gaseous matter resulting from the decomposition of poly(azidoformate) produces density-reducing cells in the core layer. The unoriented foamed film measures approximately 40 mils in thickness. This sheet is subsequently oriented seven by seven and one-half times using a commercially available sequential biaxially orienting apparatus to provide the foamed, opaque laminate film. The MD orientation temperature is about 105° C. and the TD orientation is about 135° C. The resulting 1.9 mil film possesses a density of about 0.40 and exhibits a lustrous appearance.

EXAMPLE 2

Example 1 is substantially repeated but with the addition of 5 weight percent of titanium dioxide-coated mica particles to each of the skin layers. The resulting film laminate, in addition to possessing properties similar to the film laminate of Example 1, exhibits a significant increase in stiffness.

What is claimed is:

1. A foamed, opaque, oriented polymeric film laminate which comprises:
   (a) a thermoplastic polymer film containing a quantity of voids sufficient to render said film opaque, a substantial number of the voids containing at least one void-initiating particle which is phase distinct and incompatible with the polymer constituting the film, the void space occupied by the particle being substantially less than the volume of the void, with one generally cross-sectional dimension of the particle approximating a corresponding cross-sectional dimension of the void; and,
   (b) an optional void-free thermoplastic polymer skin layer adherently applied to at least one surface of polymer film (a), there being present in polymer film (a) and/or in optional skin layer (b) a quantity of vacant cells, the total volume of voids and cells being sufficient to substantially reduce the density of the entire polymeric film structure.

2. The film laminate of claim 1 wherein the void-containing polymer film (a) is fabricated from isotactic polypropylene.

3. The film structure of claim 2 wherein optional void-free thermoplastic polymer film skin layer (b) is fabricated from isotactic polypropylene.

4. The film structure of claim 1 wherein void-containing film (a) and optional void-free skin layer (b) are each fabricated from isotactic polypropylene.

5. The film structure of claim 1 wherein the void-initiating particles are substantially spherical.

6. The film structure of claim 1 wherein the void-initiating particles are fabricated from polybutylene terephthalate.

7. The film structure of claim 1 wherein the void-initiating particles are substantially spherical particles of polybutylene terephthalate.

8. The film structure of claim 1 possessing an overall density of from about 0.3 to about 0.5 gm/cm$^3$.

9. The film structure of claim 1 possessing an overall density of from about 0.35 to about 0.45 gm/cm$^3$.

10. The film structure of claim 1 wherein there is a void-free and cell-free skin layer (b) adherently applied to one or both surfaces of void and cell-containing film (a).

11. The film structure of claim 10 wherein one or both skin layers (b) contains a stiffness-enhancing amount of titanium dioxide-coated mica particles.

12. The film structure of claim 1 which is biaxially oriented.

13. A process for preparing a foamed, opaque, oriented polymer film structure which comprises:
    (a) providing a mixture of (i) thermoplastic polymer, (ii) a void-forming material which is phase distinct from the polymer and is incompatible therewith and, optionally, (iii) a foaming agent, it being further provided that when foaming agent is present, the mixture be maintained under elevated pressure to prevent premature expansion of the foaming agent;
    (b) heating the mixture to a temperature at least above the melting point of the thermoplastic polymer (i);
    (c) dispersing the void-forming material substantially uniformly throughout the molten polymer in the form of microspheres;
    (d) extruding the microsphere-containing polymer mixture into a film, it being further provided that where foaming agent is present therein, the mixture be extruded into a zone of reduced pressure whereby the resulting expansion of foaming agent results in the formation of density-reducing cells in the film;
    (e) providing an optional molten thermoplastic polymer optionally containing a foaming agent, it being further provided that when foaming agent is present, the optional molten thermoplastic polymer be maintained under elevated pressure to prevent premature expansion of the foaming agent;
    (f) extruding the optional molten thermoplastic polymer into a film, it being further provided that where foaming agent is present therein, the mixture be extruded into a zone of reduced pressure whereby the resulting expansion of foaming agent results in the formation of density-reducing cells in the film;
    (g) adherently applying the optional film resulting from step (f) either before or after expansion of optional foaming agent therein to a surface of the microsphere-containing film resulting from step (d) either before or after expansion of optional foaming agent therein to provide a laminate film structure; and,
    (h) orienting the film of step (f) or, where present, the laminate film structure of step (g), at a temperature and to an extent to form opaquing particle-containing voids in the microsphere-containing film, it being required that when the optional film of step (f) is not present, foaming agent must be present in the mixture of (a).

14. The process of claim 13 wherein the polymer constituting the void-containing film is an isotactic polypropylene.

15. The process of claim 14 wherein the polymer constituting the void-free optional film is an isotactic polypropylene.

16. The process of claim 13 wherein the void-initiating particles are substantially spherical.

17. The process of claim 13 wherein the void-initiating particles are fabricated from polybutylene terephthalate.

18. The process of claim 13 wherein the void-initiating particles are substantially spherical particles of polybutylene terephthalate.

19. The process of claim 13 wherein the void-containing film has been coextruded with the optional void-free film to provide a laminate film structure.

20. The process of claim 13 wherein the film structure is biaxially oriented.

21. The process of claim 19 wherein the laminate film structure is biaxially oriented.

22. The process of claim 19 wherein there is a void-free and cell-free skin layer (b) coextruded upon one or both surfaces of void and cell-containing film (a).

23. The process of claim 22 wherein one or both skin layers (b) contains a stiffness-enhancing amount of titanium dioxide-coated mica particles.

24. The process of claim 13 wherein the foaming agent is of the expanding solvent-type.

25. The process of claim 13 wherein the foam is of the chemical type.

26. The process of claim 22 wherein the foaming agent is of the expanding solvent type.

27. The process of claim 22 wherein the foaming agent is of the chemical type.

* * * * *